Patented Sept. 25, 1928.

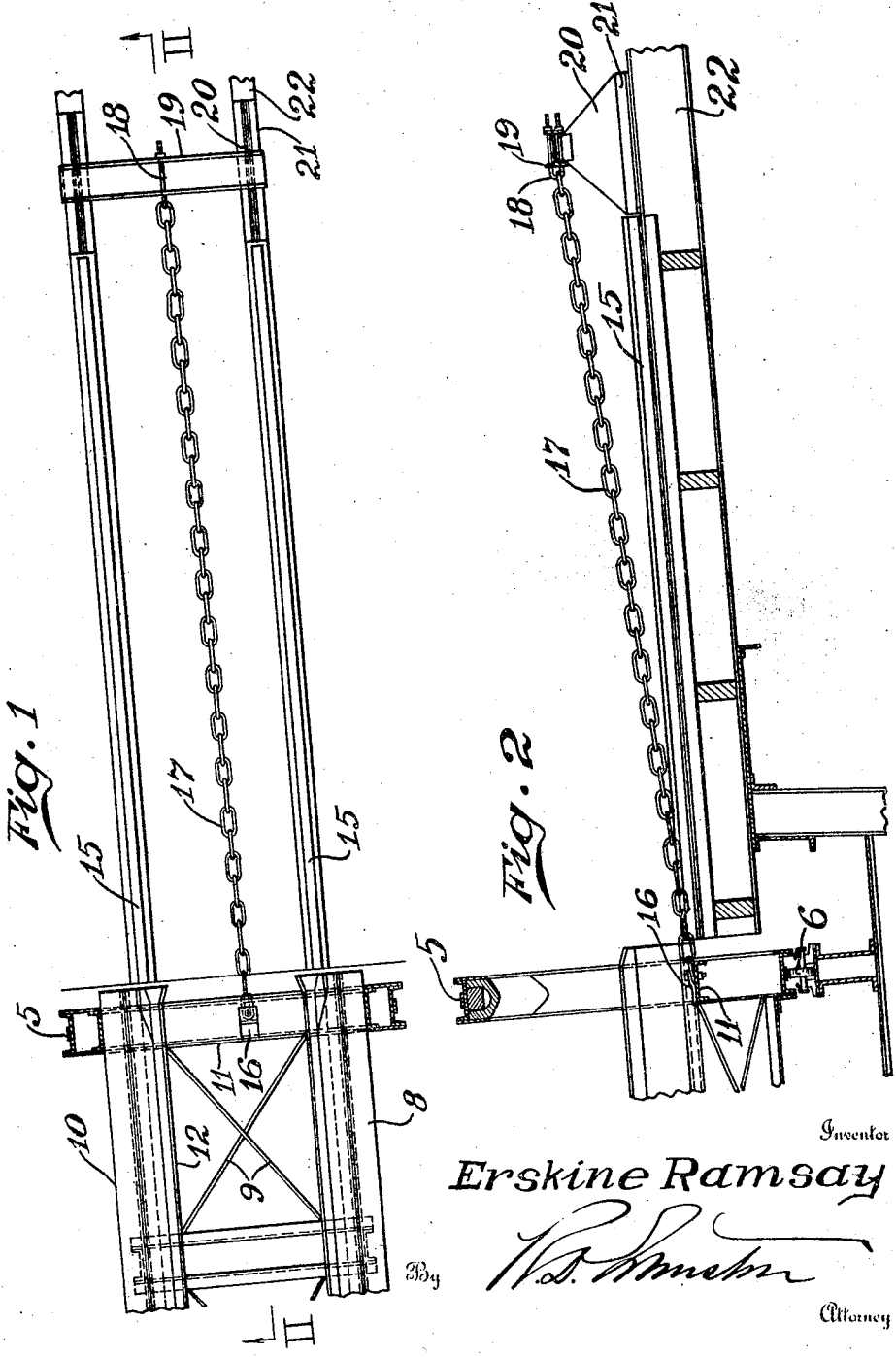

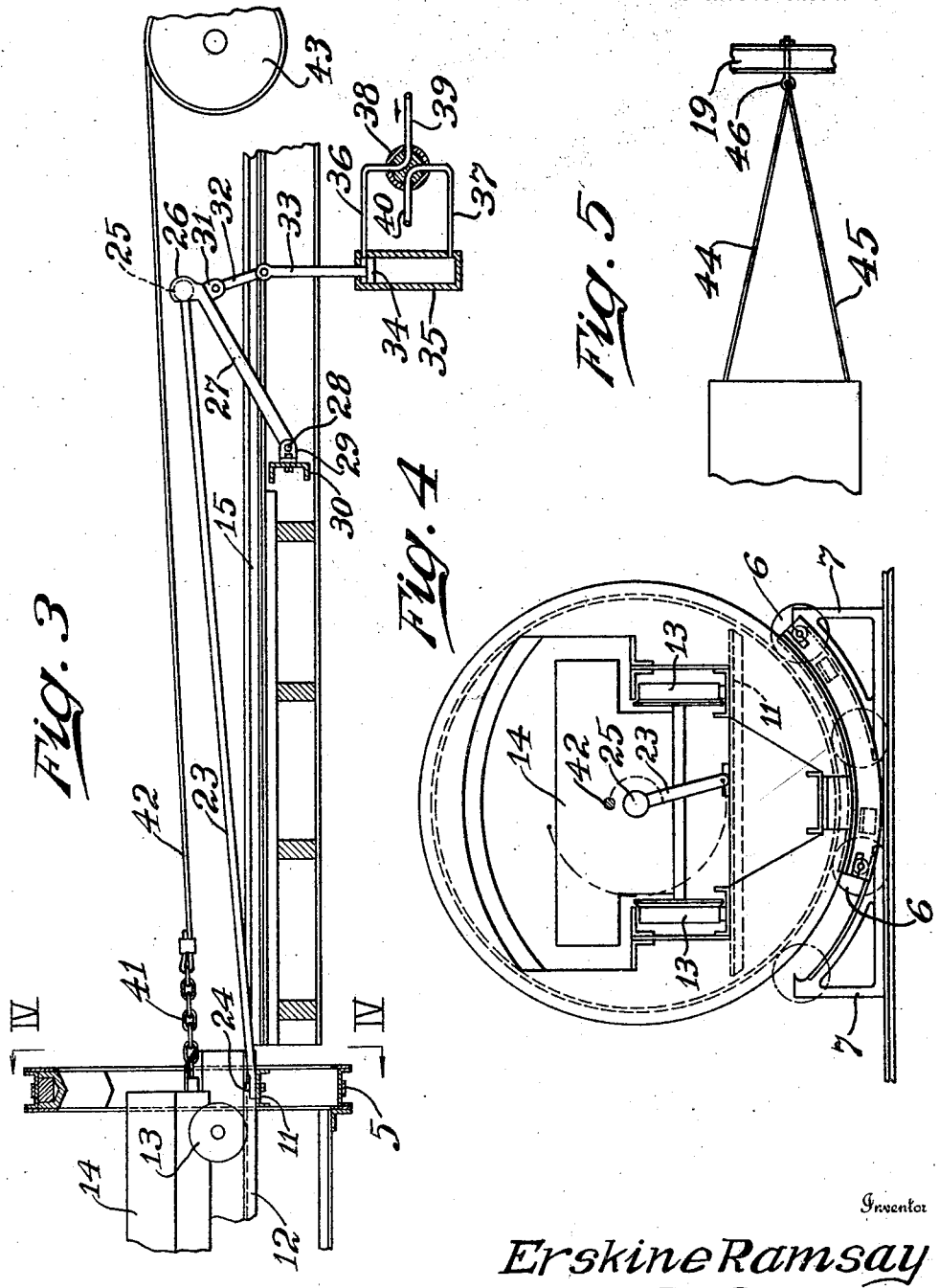

1,685,203

UNITED STATES PATENT OFFICE.

ERSKINE RAMSAY, OF BIRMINGHAM, ALABAMA.

ROTARY DUMP.

Application filed June 7, 1927. Serial No. 197,053.

My invention relates to rotary dumps of the type adapted to rotate about the fixed long axis of the dump, whether such dumps be disposed level or at an incline, and my object is to provide a simple and effective means for holding the dump against endwise displacement as it rotates. Heretofore, the end thrust of the dump has been taken by rollers or other thrust bearings which engage one or more of the riding rings or other parts of the dump, but it is obviously desirable to avoid the use of the same on account of both expense and maintenance if a more effective and yet less expensive means can be provided for fully taking care of the end thrust of the dump. My invention provides such a means in that the endwise thrust of the dump is taken care of by the provision of a thrust member connected to either or both ends of a level dump and preferably to the high end of an inclined dump, which member is adapted to follow the rotation of the dump and hold it so that it will ride without displacement and always in correct position on its riding rings or other supports.

It is a further feature of my invention that this swinging thrust member for the dump shall be connected to the dump frame preferably at a point as near as practical to its axis and that it shall connect to a stationary mounting at a point substantially in line with the axis of the dump, but the thrust member may be of multiple construction and may connect at one or more points to the dump.

It is a further object that the connection of a single thrust member shall be made sufficiently off center of the dump so that it will in swinging with the dump clear the haulage cable for the mine cars in the dump where such is used for hauling the cars.

It is a further object of my invention to provide the thrust member or members for the level dump with a depressible mounting capable of being dropped so that mine cars can pass over it as they approach or leave the dump.

My invention further contemplates the designing of the stationary mounting for the thrust member to serve as a bumper to protect the haulage means in case of overwinding.

My invention also comprises the novel details of construction and arrangements of parts, which, in their preferred embodiments only, are illustrated in the accompanying drawings, which form a part of this specification, and in which:—

Fig. 1 is a plan view showing an inclined type of dump with the dump cage broken away and the mine car omitted, a flexible thrust member being here employed which is attached to a rigid bumper mounting.

Fig. 2 is a vertical cross-sectional view taken on the line II—II of Fig. 1, showing the dump mounting in side elevation.

Fig. 3 is a view corresponding to Fig. 2 of a level dump with a modified rigid thrust member having a depressible mounting, the car being shown with a conventional haulage means.

Fig. 4 is an end view of Fig. 3 taken on the line IV—IV of Fig. 3, and omitting the mounting elements for the thrust member.

Fig. 5 is a diagrammatic view showing a pair of thrust members connected to opposite sides of the dump.

Similar reference numerals refer to similar parts throughout the drawings.

In the embodiment of my invention illustrated in Fig. 1, I have shown a conventional type of rotary dump but it is to be understood that my invention is available for use with any type of dump which rotates about a fixed long axis. The dump shown is provided with riding rings 5, which turn upon roller supports 6 mounted on tracks 7. The roller mechanism illustrated forms no part of my present invention and is intended merely to illustrate one method of supporting the dump for rotation about its long axis. The dump comprises a number of riding rings which are cross braced and connected by the members 8, 9, and 10, and the riding rings have cross braces 11 upon which tracks 12 are mounted to receive the wheels 13 of mine cars 14. The dump tracks 12 are adapted to align with stationary approach tracks 15, which in Fig. 1 are inclined and in Fig. 3 are level or substantially so. A suitable clip 16 is attached, slightly off center on the cross support 11 for the tracks, and this clip is attached to a chain 17 which extends at an upward inclination to an adjustable U-bolt fastening 18 which is mounted in a cross channel 19 rigidly braced and supported at each end by frames 20 which have their bases 21 rigidly attached to suitable foundations or supports 22. This serves as a bumper to prevent overwinding damaging the haulage means. It will be observed that the point of connection of the chain 17 to the U-bolt 18 is substantially in line with the projected axis of rotation of the dump and the clip 16 is slightly off center to prevent it coming into contact with the haulage rope as the dump rotates.

In operation, the chain will follow the rotation of the dump defining a cone surface in its movement and will at all times freely and positively resist endwise thrust of the dump and hold it in true position on its roller supports. Thus, this simple and inexpensive appliance will dispense with all thrust and roller bearings together with their expensive bracing and supports and will eliminate any wear therefrom on the riding rings.

In Figs. 3 and 4 I illustrate a modification of the invention showing here in place of the chain 17, a rod 23 which is connected by a bolt 24 off center to the cross member 11 and which at its other end is provided with a ball or equivalent universal joint member 25 which is received in a ball socket 26 carried by an arm 27 pivotally connected at 28 to a clip 29 bolted to a cross channel 30 anchored in the track. The arm 27 has a perforated lug or ear 31 which is connected by a link 32 to the piston rod 33 of a piston 34, which piston works in a cylinder 35 connected at its opposite ends by pipes 36 and 37 to a four-way valve 38 having an inlet connection 39 and an exhaust 40. The car in this construction is shown with the usual chain connection 41 by means of which it is connected to a haulage cable or rope 42 which leads to the haulage drum or sheave 43.

By reference to Fig. 4, it will be noted that the dotted lines indicate the travel of the free end of the rod 23 and of the cable 42, showing that these will not interfere during the partial rotation of the dump. When desired to bring cars into the dump from both ends or to move the trip on through the dump it will be necessary to drop the support for the rod 23 to clear the cars and under such conditions the valve 38 is shifted to apply power above the piston 34 and to exhaust it from below, thereby drawing the arm 27 downwardly to a level which will permit the cars to pass freely over it. Obviously, the same type of depressible mounting can be used in connection with the chain 17 in Fig. 1 or the rigid rod and its universal joint may be used in place of the chain. This rod 23 will function exactly like the chain 17 to freely follow the rotation of the dump while overcoming the endwise thrust thereon and holding it in correct riding position on the rollers 6. It is also obvious that this rod may act in tension or compression, thus permitting it to be placed at the desired end or ends of a dump.

In Fig. 5 I show a pair of thrust members 44 and 45 which are connected to opposite sides of the dump and which have, preferably, a common universal joint connection to a common mounting 46 which may be a rapid bumper or may be depressible.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. The combination with a rotary dump adapted to turn about a longitudinal fixed axis, of means to overcome endwise movement of the dump, comprising a mounting spaced from and in line with the dump, and swinging connecting means between said mounting and dump, the point of attachment of said connecting means to its mounting being adjacent to the projected axis of rotation of the dump.

2. A dump mechanism according to claim 1, in which the connecting means is inclined downwardly from its mounting and attached to the dump adjacent to the track level therein.

3. A dump mechanism according to claim 1, in which the point of attachment of the connecting means to the dump is slightly off center on the down going side of the dump as it moves to rotate.

4. A dump mechanism according to claim 1, in which the connecting means is adapted to swivel to permit it to freely follow the rotating movements of the dump.

5. A dump mechanism according to claim 1, in combination with means to depress the mounting to permit cars to pass it in approaching or leaving the dump.

6. The combination with a dump adapted to rotate about a longitudinal fixed axis, of a mounting rising substantially to a level with the projected axis of rotation of the dump, a connection swivelled to said mounting substantially in line with said axis, a cross member in the dump adjacent to the track level therein, and means to attach said connection substantially centrally to said element.

7. The combination with a dump adapted to rotate about a longitudinal fixed axis, of a mounting rising substantially to a level with the projected axis of rotation of the dump, a connection swivelled to said mounting substantially in line with said axis and connected to the dump, its connection at its mounting being below the line of travel of a haulage cable leading to cars in the dump, and its point of attachment to said dump being disposed off center on the down going side of the dump as it moves.

In testimony whereof I affix my signature.

ERSKINE RAMSAY.